United States Patent

Takahashi et al.

[11] Patent Number: 5,828,362
[45] Date of Patent: Oct. 27, 1998

[54] PLANE SEQUENTIAL COLOR DISPLAY APPARATUS AND METHOD FOR DRIVING SAME

[75] Inventors: Takao Takahashi, Tokyo; Naohisa Arai, Kanagawa, both of Japan

[73] Assignee: Sony Corporation, Tokyo, Japan

[21] Appl. No.: 506,345

[22] Filed: Jul. 24, 1995

[30] Foreign Application Priority Data

Aug. 4, 1994 [JP] Japan ................................ 6-202866

[51] Int. Cl.$^6$ ............................................. G09G 5/04
[52] U.S. Cl. ........................ 345/153; 345/151; 358/532
[58] Field of Search ........................... 345/22, 10, 150, 345/151, 153, 154; 348/687, 688, 751, 756, 761, 663, 664; 358/530, 532

[56] References Cited

U.S. PATENT DOCUMENTS 5,357,353  10/1994  Hirota ..................................... 358/530

FOREIGN PATENT DOCUMENTS

A-0 541 295  5/1993  European Pat. Off. .
A-0 547 603  6/1993  European Pat. Off. .
A-0 573 925  12/1993  European Pat. Off. .
A-0 598 595  5/1995  European Pat. Off. .

OTHER PUBLICATIONS

Patent Abstracts of Japan, vol. 11, No. 374 (E–562) & JP–A–62 141854 (Fuji Phot Film Co. Ltd), abstract.
Patent Abstracts of Japan, vol. 15, No. 304, (E–1096) & JP–A–03 108982 (FUJITSU), abstract.
Patent Abstracts of Japan, vol. 17, No. 54 (P–1480) & JP–A–04 267246 (FUJITSU), abstract.

Primary Examiner—Regina Liang
Attorney, Agent, or Firm—Frommer Lawrence & Haug LLP; William S. Frommer

[57] ABSTRACT

A minimum value detecting circuit detects a minimum value among digital R, G, B signals (three primary color signals) for each pixel (one sample) and the minimum value is supplied as a Wht signal (achromatic signal) to a quadruple-speed signal processing circuit. R', G', B' signals (corrected three primary color signals) are generated by subtracting the Wht signal from the R, G, B signals, respectively, and are supplied to the quadruple-speed signal processing circuit. The quadruple-speed signal processing circuit time-division-multiplexes the corrected three primary color signals and the Wht signal to generate a quadruple speed signal. By rendering $\pi$ cells ON (rotation by 0°) or OFF (rotation by 90°) based upon the time-division-multiplexed signal, a color picture using four time-compressed fields per ordinary field is obtained.

9 Claims, 8 Drawing Sheets

Fig. 1

Fig. 2A  INPUT VIDEO SIGNAL

Fig. 2B  QUADRUPLE-SPEED SIGNAL

Fig. 2C  LCS 1

Fig. 2D  LCS 2

|  | OUTPUT OF π CELL 16 | OUTPUT OF π CELL 18 | DISPLAY |
|---|---|---|---|
| W | RGB ─┼─ R  (ON) | RGB ─┼─  (ON) | RGB ─┼─ |
| R | R ─┼─ RGB  (OFF) | R ─┼─ B  (ON) | R ─┼─ |
| G | RGB ─┼─ R  (ON) | ─┼─ RGB  (OFF) | ─┼─ G |
| B | R ─┼─ RGB  (OFF) | B ─┼─ R  (OFF) | B ─┼─ |

Fig. 7A  INPUT VIDEO SIGNAL
Fig. 7B  TRIPLE-SPEED SIGNAL
Fig. 7C  LCS 1
Fig. 7D  LCS 2

(RELATED ART)

Fig. 8A    Fig. 8B (RELATED ART)

PLANE SEQUENTIAL COLOR DISPLAY APPARATUS AND METHOD FOR DRIVING SAME

BACKGROUND OF THE INVENTION

This invention relates to a plane-sequential color display apparatus and a method for driving that apparatus by which color pictures can be displayed by providing sequential pictures of individual ones of the three primary colors for each field or shorter period.

When rays of light containing two or more colors enter the human eye, they are mixed on the retina and are recognized as a color different from the individual incoming colors. The incoming colors are mixed to produce the color seen by an additive process. Colors which cannot be obtained by the additive process are R (red), G (green) and B (blue), these are the three primary colors. Any desired color can be obtained by combining the three primary colors in the additive process. The three primary colors are thus used as the basic foundation of color displays.

Color displays, in general, utilize a parallel additive process, a sequential additive process, a simultaneous additive process, and so forth. All of these additive processes rely on the inherent resolution limitations of the human eye. Sequential additive processing is generally referred to as plane-sequential processing. The various types of sequential additive processes are generally classified into two groups: the color shutter type and the back light type.

Figure 6:
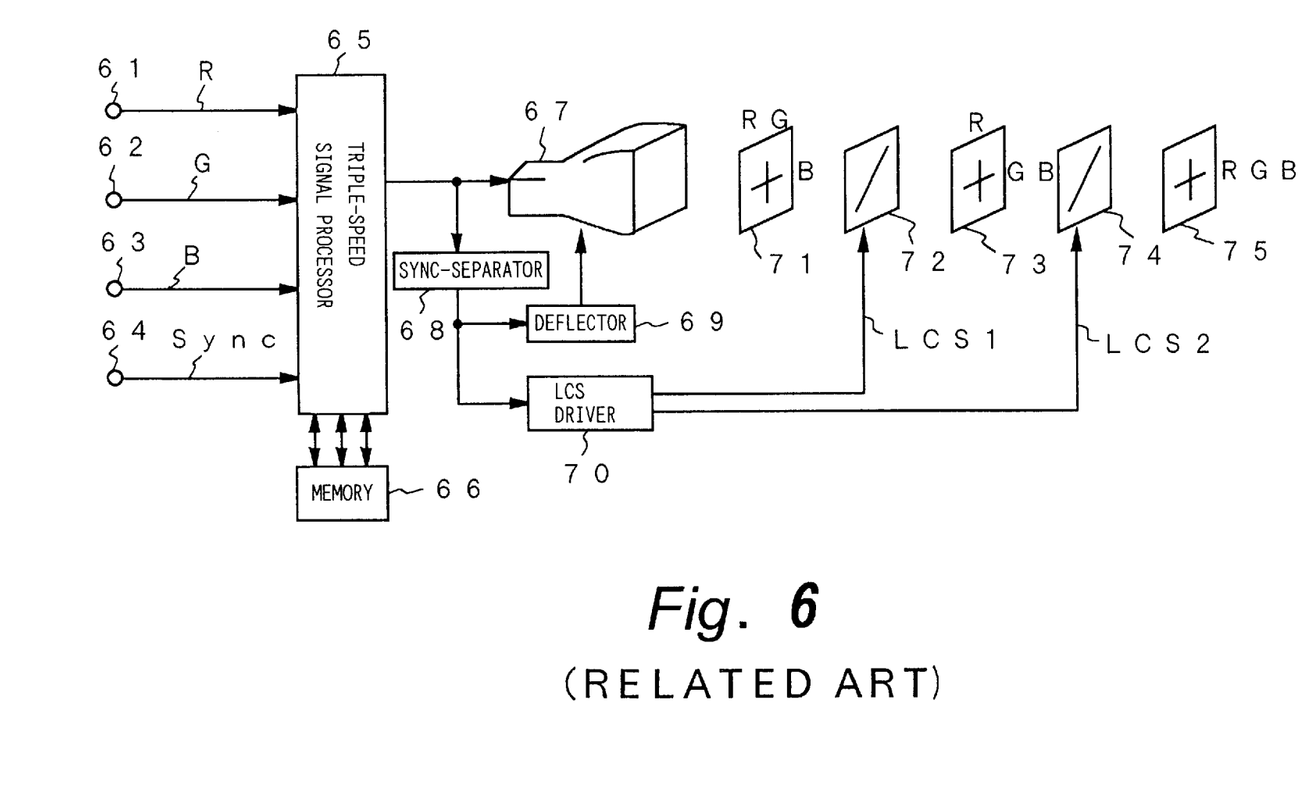
FIG. 6 illustrates a block diagram of related art.
Figure 7A:
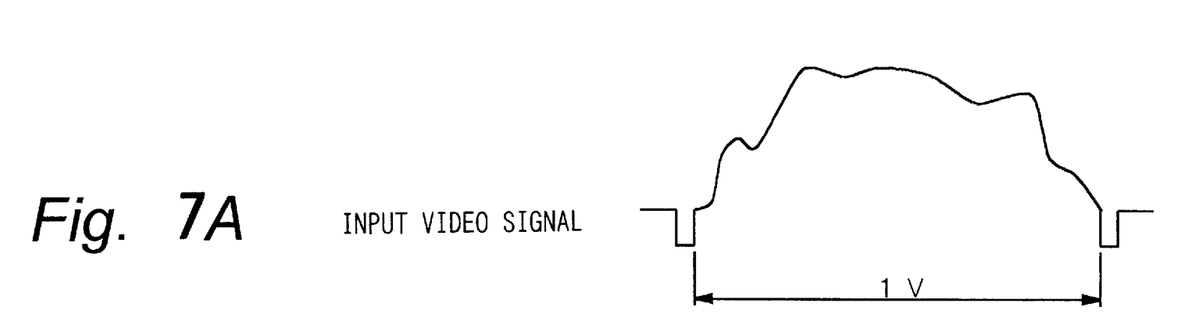
FIGS. 7A–7D show illustrative waveforms of signals produced by the apparatus shown in FIG. 6.

FIG. 6 is a block diagram of a color display utilizing a plane-sequential display of the color-shutter type. FIG. 7 shows typical waveforms of signals produced by various elements of the block diagram. The R (red) signal, separated from the composite color video signal of FIG. 7A, is input through input terminal 61, the G (green) signal is input through input terminal 62, the B (blue) signal is input through input terminal 63, and a synchronizing signal Sync is input through input terminal 64. The composite color video signal of FIG. 7A does not illustrate the color carrier signal for simplicity. The R, G and B signals are converted from analog to digital signals by an A/D converter (not shown).

Figure 7B:
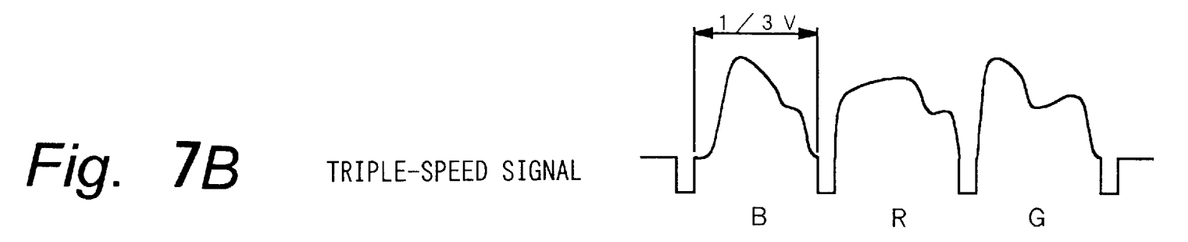

The digital signals from the input terminals 61 to 64 are supplied to triple-speed signal processing circuit 65. The triple-speed signal processing circuit, having field memory 66, compresses the time base by a factor of three and multiplexes the resultant time base-compressed primary color signals to generate time-division multiplexed signals. Thus, the triple-speed signal shown in FIG. 7B is generated from the triple-speed signal processing circuit. The triple-speed signal is supplied to a CRT (cathode ray tube) display 67 and to sync-separating circuit (sync separator) 68. The sync-separating circuit separates the synchronizing signal from the triple-speed signal and supplies it to deflection circuit (deflector) 69 and to LCS (liquid crystal shutter) driving circuit 70.

Deflection circuit 69 deflects CRT display 67 based on the synchronizing signal and the CRT displays a picture. The horizontal and vertical deflecting frequencies are three times the ordinary frequencies and the R, G and B signals are sequentially displayed during one field to form the picture. LCS driving circuit 70 generates timing signals for π (variable polarization retarder or rotator) cells 72 and 74 based on the synchronizing signal.

Figure 7C:
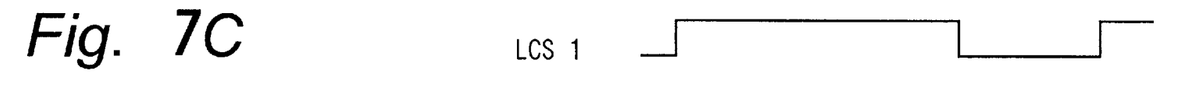
Figure 7D:
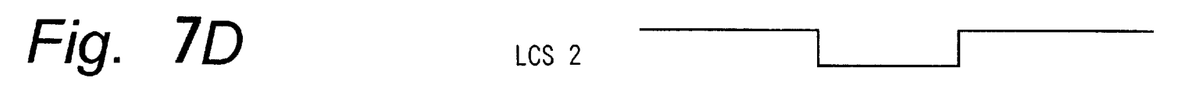

Driving pulse LCS1 from the LCS driving circuit is supplied to π cell 72, and driving pulse LCS2 is supplied to π cell 74. The picture displayed by CRT display 67 is processed by the plane-sequential color display apparatus, shown in FIG. 6, using three color polarizing plates 71, 73, 75 and two π cells 72, 74 optically coupled to the display screen of CRT display 67. FIG. 7C is a timing waveform of driving pulse LCS1 and FIG. 7D is a timing waveform of driving pulse LCS2. π cells 72, 74 rotate the incoming light by 0° when they are ON, that is, they output the incoming light as it is received. When the π cells are OFF, they rotate the incoming light by 90° and output it.

As a result, the B picture is displayed when both driving pulses LCS1 and LCS2 are ON; the R picture is displayed when driving pulse LCS1 is ON and driving pulse LCS2 is OFF; and the G picture is displayed when driving pulse LCS1 is OFF and driving pulse LCS2 is ON. A full color picture is formed by repeatedly displaying the R, G and B pictures in sequence according to this scheme.

U.S. Pat. No. 4,582,396 describes a plane-sequential color display apparatus using a two color shutter disposed in front of a frame-sequential display device in which a nematic liquid crystal variable optical retarder is sandwiched between two polarizing plates on the one hand and one polarizing plate on the other.

Figure 8A:
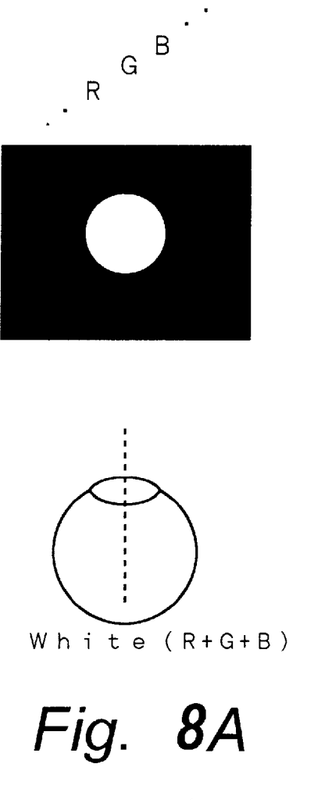
FIGS. 8A and 8B are useful in explaining color breakup.
Figure 8B:
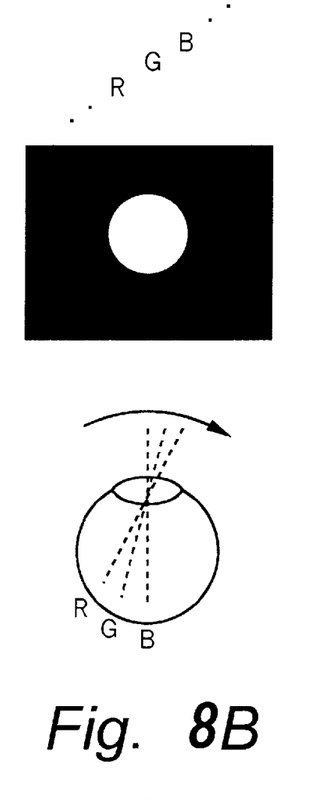

These color displays have no substantial problems when the human eye directly views the display; however, when the eye is turned away from the display, positions of the afterimage of the R, G and B signals on the retina may differ and thereby cause an achromatic object to look colored. When the eye remains stationary, as shown in FIG. 8A, the afterimages of the three primary colors for a white ball (as an example) remain in a fixed position on the retina. However, as shown in FIG. 8B, as the eye moves, the afterimages of the three primary colors that are displayed sequentially are located in different positions on the retina, and as a result, the white ball looks colored. This phenomenon is called color breakup, which is more likely to occur as the brightness level of the image increases and as the object of the image becomes achromatic.

SUMMARY AND OBJECTS OF THE INVENTION

It is therefore an object of the invention to provide a plane-sequential color display apparatus and a method for driving that apparatus to ensure that the display is free from color breakup.

In the plane-sequential color display apparatus according to the present invention, three primary color signals are received and from which corrected three primary color signals and an achromatic signal are produced. An imaging device is sequentially driven in response to the corrected three primary color signals and achromatic signal, and at least one color shutter is disposed on the optical axis in series with the imaging device and switched in response to a synchronizing signal.

The achromatic signal is produced by detecting a minimum or maximum value among the received three primary color signals and the detected minimum or maximum value is used as the achromatic signal. The corrected three primary color signals are based on the difference between the received three primary color signals and the achromatic signal.

An emphasis circuit sharpens an edge of the achromatic signal and a deemphasis circuit blunts an edge of the three primary color signals.

A brightness and moving detector detects the brightness level and movement of an image to activate the circuit when a high brightness level and movement (preferably substantial movement) of the image are detected.

The imaging device is sequentially driven by time-division-multiplexing the corrected three primary color signals and the achromatic color signal to generate a quadruple speed signal.

DETAILED DESCRIPTION OF THE PREFERRED EMBODIMENTS OF THE INVENTION

A monochromatic image display apparatus comprises three color polarizing plates and two π (variable polarization retarder or rotator) cells which are sequentially driven by R, G, B and Wht (or white) signals. Since the white signal Wht exhibits a level common to the R, G and B signals, a picture is affected by the Wht signal more than by the other signals as the brightness level of the picture increases or as the picture becomes achromatic. Thereby, color breakup can be prevented in an achromatic picture or in a picture having a high brightness level.

Figure 1:
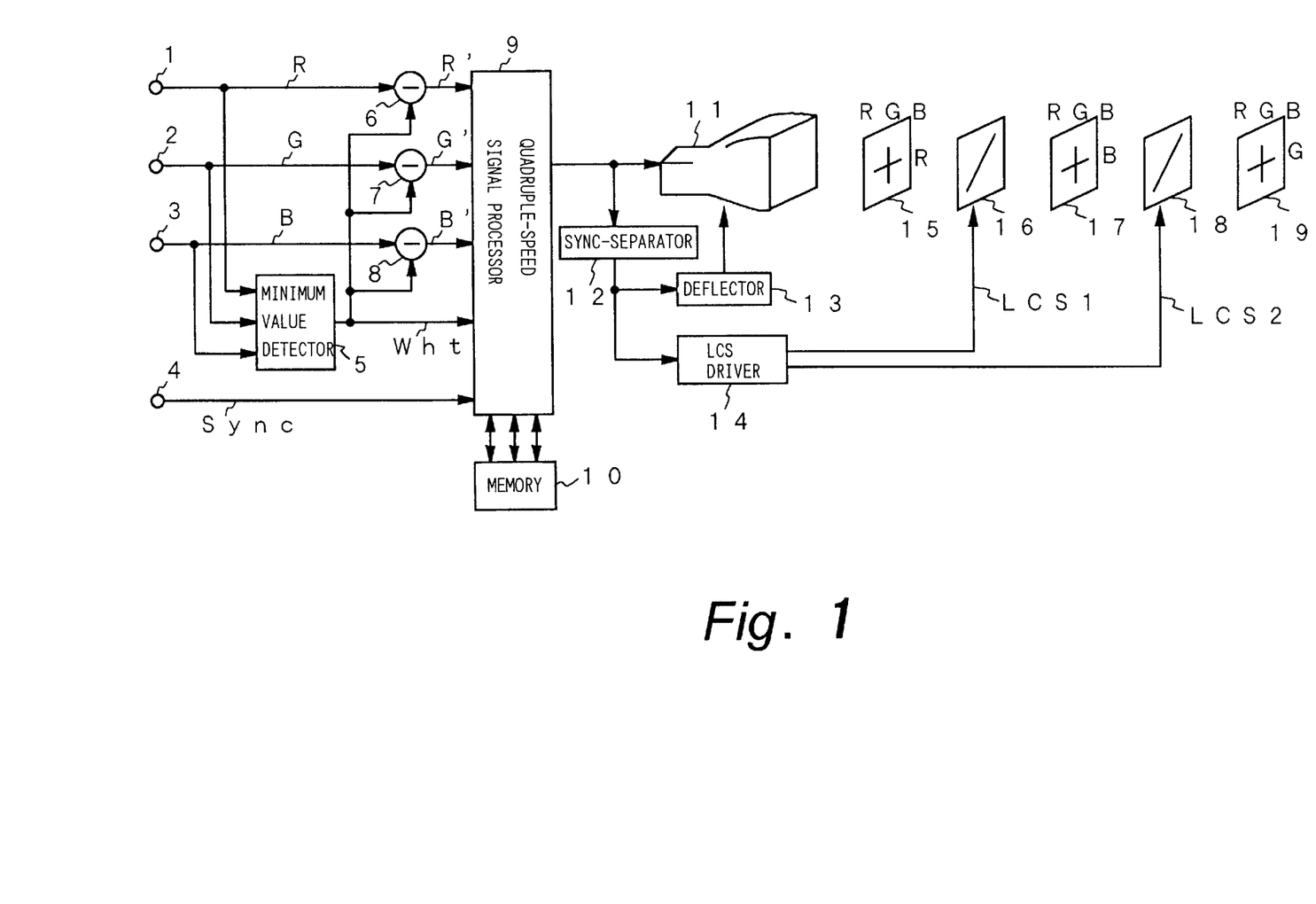
FIG. 1 illustrates a block diagram of an embodiment of a plane-sequential color display of the color shutter type according to the present invention.
Figure 2A:
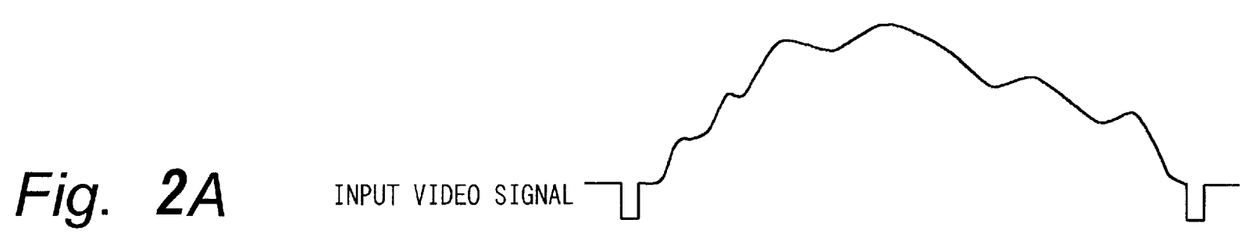
FIGS. 2A–2D illustrate typical waveforms of signals produced by various elements in the color display according to the present invention.

Embodiments of the invention are described below with reference to the drawings. FIG. 1 is a block diagram of a color shutter type plane-sequential color display of the present invention. FIG. 2 shows illustrative waveforms of signals produced by different elements of the plane sequential color display of FIG. 1. The R (red) signal, separated from the composite color video signal of FIG. 2A, is input through input terminal 1, the G (green) signal is input through input terminal 2, the B (blue) signal is input through input terminal 3, and the synchronizing signal Sync (including horizontal and vertical sync signals) is input through input terminal 4. The color composite video signal of FIG. 2A does not illustrate the color carrier signal for simplicity. The input R, G and B signals are converted from analog to digital signals by an A/D converter (not shown).

The R signal is supplied to a minimum value detecting circuit 5 and to a subtracter 6. Similarly, the G signal is supplied to the minimum value detecting circuit and to a subtracter 7 and the B signal is supplied to the minimum value detecting circuit and to a subtracter 8. The minimum value detecting circuit 5 detects the minimum value among the R, G, B signals, and then supplies the detected minimum value Wht to subtracters 6, 7, 8 and to quadruple-speed signal processing circuit 9. The Wht signal is an achromatic signal having a level commonly shared by the three primary color signals. The minimum value detecting circuit 5 compares the R signal with the G signal, the G signal with the B signal, and the B signal with the R signal, for example, for each pixel (one sample) to detect the minimum value of the three primary color signals.

Subtracter 6 subtracts the Wht signal from the R signal, to generate a corrected R signal R' which is supplied to quadruple-speed signal processing circuit 9. Similarly, subtracter 7 subtracts the Wht signal from the G signal to generate a corrected G signal G' which is supplied to the quadruple-speed signal processing circuit, and subtracter 8 subtracts the Wht signal from the B signal to generate a corrected B signal B' which is supplied to the quadruple-speed signal processing circuit. Let it be assumed that the pixels have the following values: 5 V for the R signal, 6 V for the G signal, and 4 V for the B signal. Then, minimum value detecting circuit 5 detects 4 V as the minimum value. Therefore, the R' signal of 1 V, the G' signal of 2 V, the B' signal of 0 V, and the minimum value of 4 V as the Wht signal are supplied to the quadruple-speed signal processing circuit.

Quadruple-speed signal processing circuit 9, having field memory 10 coupled thereto, compresses the time base of the corrected three primary color signals by a factor of four and time-divisional-multiplexes the corrected three primary color signals (R', G', B' signals) and the achromatic signal (Wht signal). Thus, the quadruple-speed signal processing circuit generates a quadruple-speed signal, shown as the signal of FIG. 2B. The quadruple-speed signal is supplied to CRT display 11 and to sync-separating circuit 12. The sync-separating circuit separates the synchronizing signal from the quadruple-speed signal and supplies the synchronizing signal to deflection circuit 13 and to LCS driving circuit 14.

Deflection circuit 13 deflects CRT display 11 based on the synchronizing signal and the CRT display, which may, for example, be a black-and-white display device, displays a video picture. The horizontal and vertical deflecting frequencies are four times the ordinary frequencies and the Wht, R, G and B signals are sequentially displayed in one conventional field to form a picture. LCS driving circuit 14 generates timing signals for π (variable polarization retarder or rotator) cells 16, 18 based on the time-compressed synchronizing signal.

Figure 2B:
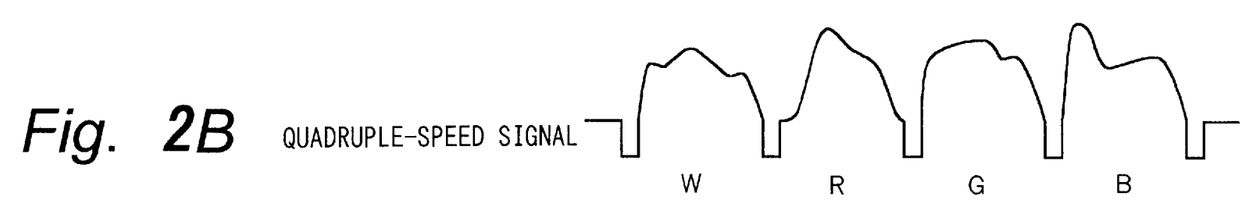
Figure 2C:
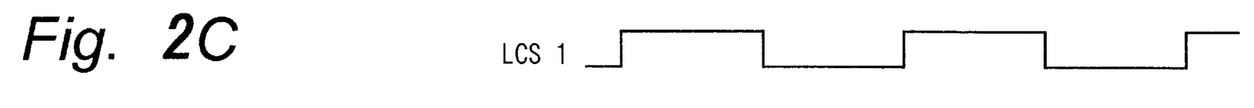
Figure 2D:
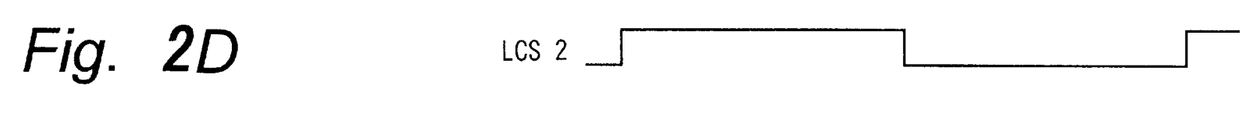

Driving pulse LCS1 from LCS driving circuit 14 is supplied to π cell 16 and driving pulse LCS2 is supplied to π cell 18. The signal of FIG. 2C is a timing waveform of driving pulse LCS1 and the signal of FIG. 2D is a timing waveform of driving pulse LCS2. π cells 16, 18 have the same functions as those of π cells 72, 74, stated above. π cells 16 and 18 are turned ON during high-level periods of driving pulses LCS1 and LCS2, respectively, and are turned OFF during low-level periods of the driving pulses.

Each of the three color polarizing plates 15, 17 and 19 passes selected portions of the signals output from CRT display 67. Color polarizing plate 15 passes longitudinal R, G, B and lateral R signals. Color polarizing plate 17 passes longitudinal R, G, B and lateral B signals. Color polarizing plate 19 passes longitudinal R, G, B and lateral G signals. By using color polarizing plates 15, 17, 19 and π cells 16, 18, the plane-sequential color display apparatus of the present invention can sequentially output the appropriate signal to generate the desired picture.

Figure 3:
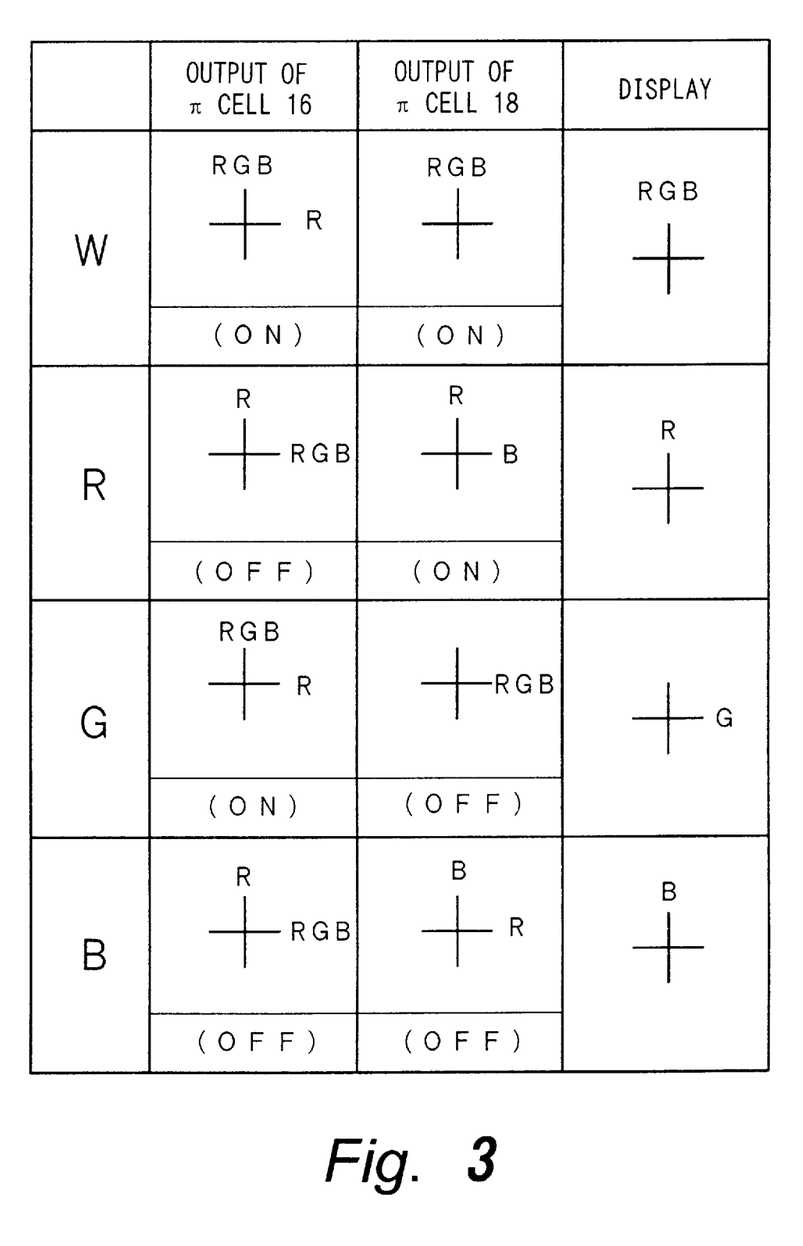
FIG. 3 is useful in explaining the operation of the plates and cells of the present invention.

The operation of the three color polarizing plates 15, 17, 19 and two π cells 16, 18, which are disposed in series on the optical axis of and are optically coupled to the display screen of CRT display 11, is explained with reference to FIG. 3. The Wht signal (achromatic signal) is output from the plane-sequential color display apparatus of the present invention when both π cells are turned ON. A ray of light is supplied to the color polarizing plate 15 from the CRT display and longitudinal R, G, B signals and lateral R signal are supplied from color polarizing plate 15 to π cell 16. Driving pulse LCS1 from LCS driving circuit 14 turns π cell 16 ON, thus the longitudinal R, G, B signals and lateral R signal are supplied from π cell 16 to color polarizing plate 17 as they were received, i.e., 0° rotation.

Only the longitudinal R, G and B signals are supplied from color polarizing plate 17 to π cell 18. Driving pulse LCS2 from LCS driving circuit 14 turns π cell 18 ON, thus the longitudinal R, G, B signals are supplied to color polarizing plate 19. The longitudinal R, G, B signals are output from color polarizing plate 19, as they were received, so that they can be viewed. Thus, the Wht signal (achromatic signal), which is a combination of the longitudinal R, G, B signals, can be obtained when both π cells are turned ON. Similarly, individual R, G and B signals can be output by turning ON (0° rotation) and/or OFF (90° rotation) the two π cells, as shown in FIG. 3.

When both π cells are turned ON by driving pulses LCS1 and LCS2, respectively, the Wht signal is output; when π cell 16 is turned OFF and π cell 18 is turned ON, the R signal is output; when π cell 16 is turned ON and π cell 18 is turned OFF, the G signal is output; and when both π cells are turned OFF, the B signal is output. Thus, three color polarizing plates 15, 17, 19 and two π cells 16, 18 are used to output the desired signals. The use of a level commonly shared by R, G, B signals (three primary color signals) as the Wht signal (achromatic signal) makes the effect of the Wht signal the strongest and removes the cause of color breakup during display of an achromatic picture or of a picture with a high brightness level.

Figure 4:
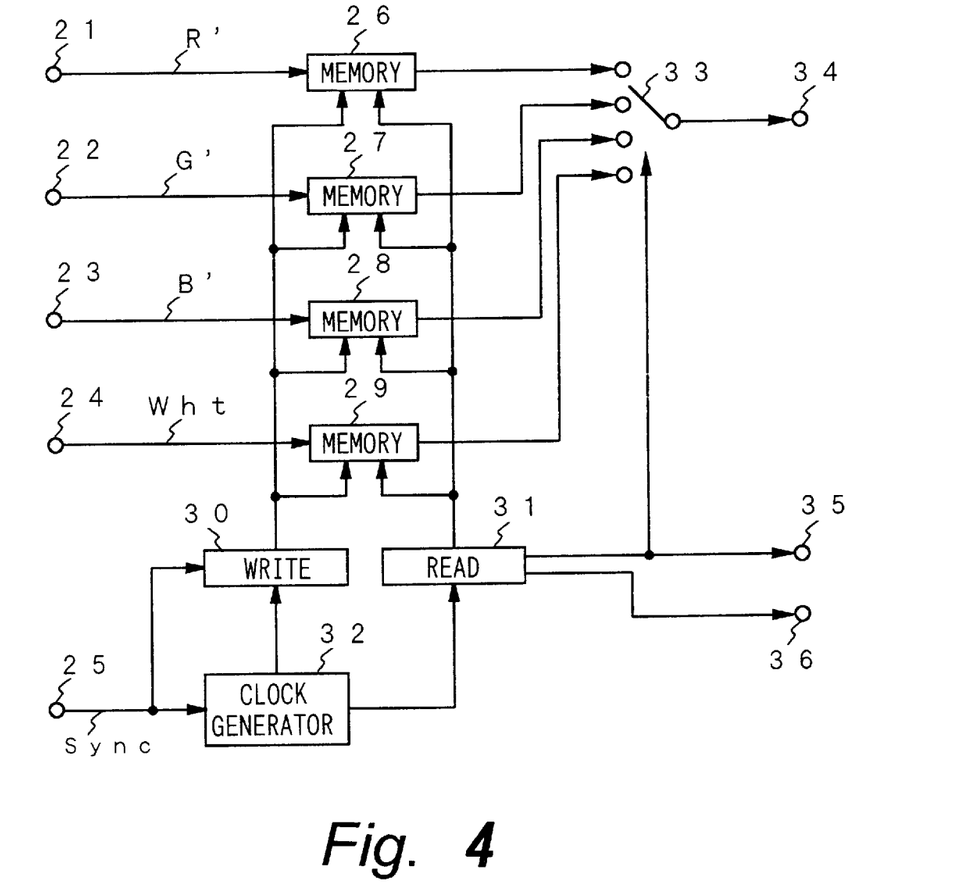
FIG. 4 illustrates a block diagram showing an example of the quadruple-speed processing apparatus according to an embodiment of the present invention.

FIG. 4 is a detailed block diagram of quadruple-speed signal processing circuit 9 according to an embodiment of the invention. The R' signal input through input terminal 21 is supplied to a field memory 26, the G' signal input through input terminal 22 is supplied to a field memory 27, the B' signal input through input terminal 23 is supplied to a field memory 28, and the Wht signal input through input terminal 24 is supplied to a field memory 29. The synchronizing signal Sync coupled to input terminal 25 is supplied to a write-control circuit 30 and to a clock generating circuit 32. As mentioned above, the synchronizing signal is a composite synchronizing signal comprising both horizontal and vertical synchronizing signals.

Clock generating circuit 32 generates a clock signal based on the synchronizing signal and supplies the clock signal to write-control circuit 30 and to read-control circuit 31. The write-control circuit generates write signals for storing the input signals to the respective field memories in response to the synchronizing signal and the clock signal. The R', G', B' and Wht signals are stored in field memories 26, 27, 28, 29, respectively, during each field period. The signals stored in the field memories are read out in response to the read signals supplied from read-control circuit 31. The signals read from the respective field memories are selected by switch 33 to form a time-division-multiplexed signal which is output through an output terminal 34.

As an example, the read clock signal has a frequency four times that of the write clock signal. Therefore, the time base is compressed by a factor of four and a quadruple-speed signal, shown as the signal of FIG. 2B, is output from output terminal 34. Read-control circuit 31 outputs a selection signal and a synchronizing signal. The selection signal controls the operation of switch 33 and is output from output terminal 35 to be used as a signal for identifying respective fields, for driving the LCS, and so forth. The synchronizing signal output from the read-control circuit is output from output terminal 36 to be used as a composite synchronizing signal for driving the deflection system of the CRT display.

Figure 5:
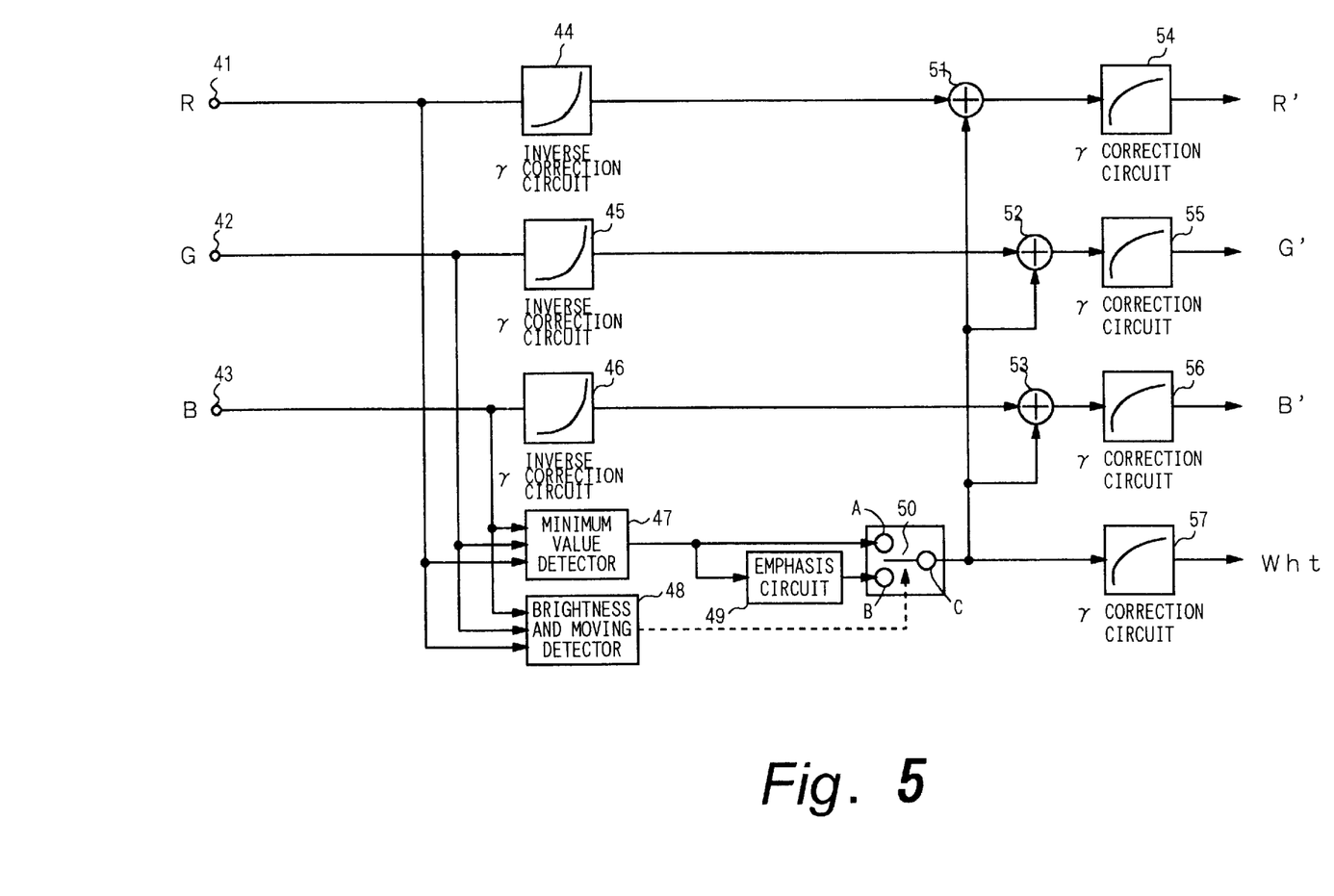
FIG. 5 illustrates another embodiment of an input circuit for the quadruple-signal processing apparatus according to the present invention.

FIG. 5 shows another embodiment of the invention where the input circuits coupled to quadruple-speed signal processor 9, namely, minimum value detector 5 and subtracters 6, 7, 8 as shown in FIG. 1, are replaced by the circuits shown in FIG. 5.

The R signal coupled to input terminal 41 is supplied to inverse γ correction circuit 44, minimum value detecting circuit 47 and brightness and moving detector 48. Similarly, the G signal coupled to input terminal 42 is supplied to inverse γ correction circuit 45, the minimum value detecting circuit and the brightness and moving detector, and the B signal coupled to input terminal 43 is supplied to inverse γ correction circuit 46, the minimum value detecting circuit and the brightness and moving detector.

The minimum value detecting circuit detects the minimum value among the R, G, B signals and the detected minimum value is supplied to input A of switch 50 and also to emphasis circuit 49. The output signal of the emphasis circuit is supplied to input B of switch 50. The output signal of the brightness and moving detector is supplied to switch 50 as a switching control signal.

Each of the output signals of inverse γ correction circuits 44, 45, 46 is supplied to subtracters 51, 52, 53, respectively. The output signal of switch 50 is coupled to subtracters 51, 52, 53 and to γ correction circuit 57. The signal output from switch 50 can be used as the Wht signal, though it is preferably coupled to γ correction circuit 57 to sharpen the Wht signal, as discussed below. Subtracter 51 subtracts the Wht signal (the output signal of switch 50) from the output signal of inverse γ correction circuit 44 to generate the corrected R signal R' which is then supplied to γ correction circuit 54. Similarly, subtracter 52 subtracts the Wht signal from the output signal of inverse γ correction circuit 45 to generate the corrected G signal G' which is supplied to γ correction circuit 55, and subtracter 53 subtracts the Wht signal from the output signal of inverse γ correction circuit 46 to generate the corrected B signal B' which is supplied to γ correction circuit 56. Each signal output from γ correction circuits 54, 55, 56, 57 is supplied to quadruple-speed signal processing circuit 9 of FIG. 4. The inverse γ correction circuits 44, 45, 46 and γ correction circuits 54, 55, 56, 57 can be realized by low pass filters or band pass filters, as the case may be.

The circuit shown in FIG. 1 cannot reduce the color breakup completely because the bands of frequency of the R, G, B and Wht signals are different from each other. To reduce color breakup completely, the frequencies of the R, G, B signals are limited so as to blunt the edges of the signals and the Wht signal is emphasized so as to sharpen its edges by using the circuit shown in FIG. 5. The edges of the R, G, B signals are blunted by decreasing the slope of the transition of the signals, both the leading and trailing edges. The inverse γ correction circuits are used with the γ correction circuits to blunt the edges of the three primary color signals. The Wht signal is sharpened by increasing the slope of the transition of the signal, both the leading and trailing edges. The brightness and moving detector detects the high-brightness level and movement of an image. When the image has a high-brightness level and movement (preferably substantial movement), the switching control signal is supplied to switch 50 to select the output signal from emphasis circuit 49 which sharpens the edge of the Wht signal.

Although the foregoing embodiments use a CRT display in the plane-sequential color display apparatus, it is also possible to use a LCD (liquid crystal display) or other monochromatic display apparatus in lieu of the CRT display.

When a LCD is used, it is possible that color polarizing plates and cells may be provided between the back light and the liquid crystal.

Although the foregoing embodiment generates R', G', B' signals (corrected three primary color signals) and the Wht signal (achromatic signal) by detecting the minimum value of the three primary color R, G and B signals; the maximum value of the R, G and B signals can be used in lieu of the minimum value with no adverse effects.

The present invention removes the cause of color breakup in a plane-sequential color display in which one frame is made up of four fields of R, G, B signals (three primary color signals) and a Wht signal (achromatic signal). By setting the Wht signal to a level commonly shared by the R, G and B signals, the invention prevents color breakup in achromatic pictures or pictures with a high brightness level which are the type of images most affected by color breakup.

While a detailed description of the preferred embodiments of the invention have been described for purposes of illustration in the foregoing specification, it is appreciated that many variations will be evident to those of skill in the art without departing from the spirit and scope of the invention.

What is claimed is:

1. Plane-sequential color display apparatus, comprising:
   means for receiving three primary color signals;
   image means for displaying a monochromatic image;
   signal producing means for producing corrected three primary signals and an achromatic signal from said received three primary signals, said signal producing means further including an emphasis circuit for sharpening an edge of said achromatic signal;
   brightness and moving detector means for detecting a brightness level and movement of an image represented by said received three primary color signals;
   means for enabling said emphasis circuit to be activated when said brightness and moving detector means detects a high brightness level movement of said image;
   driving means for sequentially driving said image means in response to said corrected three primary color signals and said achromatic signal; and
   at least one color shutter disposed on an optical axis in series with said image means and operable to be switched in synchronism with said driving means.

2. The plane-sequential color display apparatus according to claim 1, wherein said signal producing means comprises achromatic signal producing means for detecting one of a minimum or maximum value among said received three primary color signals to produce said achromatic signal in response to the detected minimum or maximum value; and means for producing said corrected three primary color signals as a function of the difference between said received three primary color signals and said achromatic signal.

3. The plane-sequential color display apparatus according to claim 2, wherein said signal producing means includes deemphasis means for blunting an edge of said received three primary color signals.

4. The plane-sequential color display apparatus according to claim 1, wherein said driving means includes means for time-division-multiplexing said corrected three primary color signals and said achromatic color signal to generate a quadruple speed signal to drive said image means.

5. The plane-sequential color display apparatus according to claim 1, wherein said color shutter is a liquid crystal panel.

6. A method for plane-sequentially driving a color display apparatus, comprising the steps of:
   receiving three primary color signals;
   producing corrected three primary color signals and an achromatic signal from said received three primary color signals;
   detecting a brightness level and movement of an image represented by said received three primary color signals;
   sharpening an edge of said achromatic signal in response to the detected high brightness level and movement of said image;
   sequentially driving a monochromatic image display in response to said corrected three primary color signals and said achromatic signal; and
   switching at least one color shutter disposed on an optical axis in series with said monochromatic image display in synchronism with the sequential driving of said monochromatic image display.

7. The method for plane-sequentially driving a color display apparatus according to claim 6, wherein said achromatic signal is produced by detecting one of a minimum or maximum value among said received three primary color signals, and using said detected minimum or maximum value to produce said achromatic signal; and said corrected three primary color signals are produced by subtracting said achromatic signal from said received three primary color signals.

8. The method for plane-sequentially driving a color display apparatus according to claim 6, further comprising the step of blunting an edge of said received three primary color signal.

9. The method for plane-sequentially driving a color display apparatus according to claim 6, wherein said monochromatic image display is driven by time-division-multiplexing said corrected three primary color signals and said achromatic signal to produce a quadruple speed signal, and using said quadruple speed signal to sequentially drive said monochromatic image display.

* * * * *